United States Patent [19]
Jakubowski et al.

[11] Patent Number: 4,842,219
[45] Date of Patent: Jun. 27, 1989

[54] TETHER ATTACHMENT DEVICE

[75] Inventors: Paul R. Jakubowski, Lutherville; Ronald L. Boies, Baltimore City, both of Md.

[73] Assignee: Westinghouse Electric Corp., Pittsburgh, Pa.

[21] Appl. No.: 115,000

[22] Filed: Oct. 30, 1987

[51] Int. Cl.⁴ .................... B64B 1/50; B64B 1/66
[52] U.S. Cl. ..................... 244/31; 244/114 R; 244/115; 340/981; 188/65.1; 182/5
[58] Field of Search ........... 244/31, 33, 155 R, 114 R, 244/115, 137.4, 110; 182/5; 104/204, 225, 233, 22, 23 R, 23 FS, 207, 209, 210; 188/65.1; 362/226, 396, 391, 62; 40/214, 211; 340/981, 983

[56] References Cited

U.S. PATENT DOCUMENTS

| 371,095 | 10/1887 | Paine | 104/229 |
|---|---|---|---|
| 2,313,437 | 3/1943 | Hedenberg | 188/65.1 |
| 2,931,466 | 4/1960 | Allenbaugh | 188/65.1 |
| 4,126,850 | 11/1978 | Randolph | 244/33 |
| 4,502,668 | 3/1985 | Dodge | 188/65.1 |
| 4,729,456 | 3/1988 | Sugiyama | 188/65.1 |

Primary Examiner—Galen L. Barefoot
Attorney, Agent, or Firm—D. Schron

[57] ABSTRACT

A unidirectional clamping mechanism for clamping a visibility enhancement device such as a strobe light to an aerostat tether subject to deployment and in-haul operation. The clamping mechanism includes diametrically opposed rollers each having a single tooth ratchet and pawl arrangement which allows unlimited rotation in one direction and limited or no rotation in an opposite direction such that when deployed, the strobe lights will not move down the tether but during an in-haul operation the mechanisms may be stacked one on top of the other while the tether is rapidly pulled through them.

21 Claims, 7 Drawing Sheets

TETHER ATTACHMENT DEVICE

BACKGROUND OF THE INVENTION

1. Field of the Invention

The invention in general relates to tethered systems, and more particularly to a device which clamps onto the tether to enhance its visibility.

2. Description of the Prior Art

The use of lighter-than-air vehicles as high altitude platforms for communication and sensor equipment has been known for many years. By suspending electronic payloads from a stabilized platform beneath an aerodynamically-shaped balloon, called an aerostat, communication and surveillance functions can be performed.

The aerostat, which may be positioned at an altitude of many thousands of meters is securely connected to a ground based mooring system by means of a high strength lightweight tether. Depending upon the location of the aerostat, and its intended purpose, governmental requirements may dictate the use of visibility enhancement devices positioned, not only on the aerostat, but on its tether as well. These visibility enhancement devices such as electronic strobes, reflective markings, flags, etc., are manually attached to the tether by operating personnel at the mooring station as the aerostat is being deployed.

In general, the rate of out-haul may be governed by an operator such that deployment may be slowed down or even stopped periodically to allow attachment of the visibility enhancement devices during the deployment operation. The in-haul or retrieval of the aerostat, however, may be governed by factors which dictate retrieval at a faster rate than deployment. For example, impending hazardous weather conditions or a malfunction which threatens the survivability of the aerostat may require retrieval at a maximum rate. Under such conditions, the periodic slowing or stopping of the in-haul to manually remove the visibility enhancement devices from the tether may increase the risk of damage to the system and may place the operating personnel in jeopardy especially in lightning storms.

Accordingly, it is an object of the present invention to provide for a tether attachment device which will not prevent a rapid in-haul operation, if required.

SUMMARY OF THE INVENTION

Apparatus for attachment of a visibility enhancement device to a tether subject to deployment and in-haul operation according to the present invention includes a unidirectional clamping means for placement around the tether and for carrying the device. Means are provided for limiting relative movement of the clamping means along the tether in one direction but not in the opposite direction.

At least one pair of rollers is provided structurally supported by a clamp assembly which clamps around the tether in a manner that the rollers firmly engage the tether. The edge of the roller has a cam surface which with the body of the roller defines a ratchet wheel with at least one tooth. A pawl arrangement rides on the cam surface and allows continual rotation of the roller in a first direction and prevents roller rotation in an opposite direction when the pawl contacts the tooth.

To evenly distribute the clamping force around the tether, the rollers preferably have a grooved circumferential surface with the groove having substantially the same curvature as the tether and covered with a relatively flexible heat shrink tubing.

For rapid in-haul operation, a stop assembly is provided so that the tether may continue to be in-hauled while the clamped-on devices stack up at the stop assembly.

DESCRIPTION OF THE PREFERRED EMBODIMENTS

Figure 1:
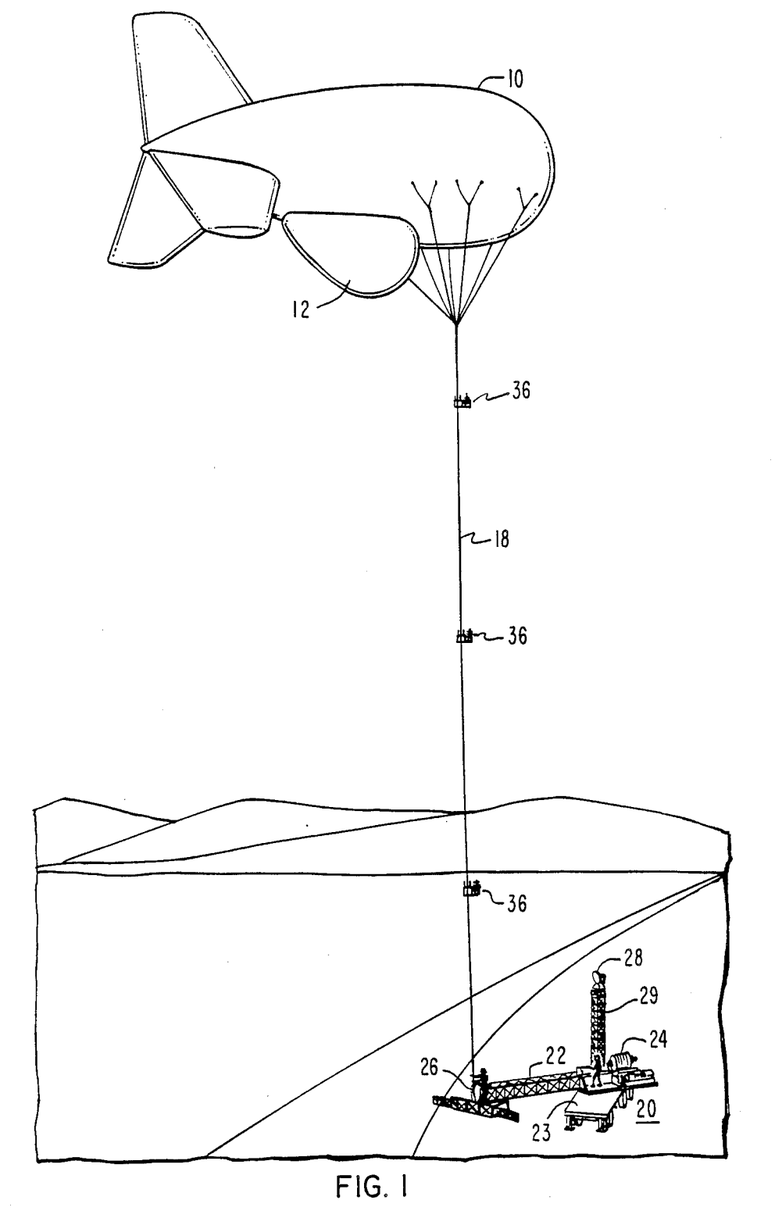
FIG. 1 illustrates a deployed aerostat system with warning lights attached to the tether.

Although the invention is applicable to various tether systems requiring an out-haul and in-haul operation, it will be described by way of example with respect to a tethered aerostat system such as illustrated in FIG. 1.

Aerostat 10 carries an electronic payload protected from the elements by an aerodynamically shaped windscreen 12 which is air pressurized to maintain its aerodynamic shape. Typically, the aerostat may carry electronic equipment which may be utilized for such operations as coastal, air and ground surveillance, communications, over-the-horizon relays, rural telephone and emergency broadcast applications.

Aerostat 10 maintains its position above the launch point by means of single cable 18 called a tether which anchors the aerostat in flight and which may provide electrical power to the airborne electronics through embedded conductors and which may also serve to conduct signals from the electronic equipment back down to a ground station. A deployment/in-haul system such as mooring system 20 is used to secure the aerostat while it is on the ground and to maintain it at a desired altitude after it is launched.

In the embodiment of FIG. 1, the mooring system 20 includes an elongated boom 22 which is rotatable about a base structure 23 and which carries a main winch 24 upon which the tether 18 is wound. The tether passes from the winch 24 through the boom 22 and around a pulley 26, generally known as a flying sheave located at the end of the boom and rotatable about the boom axis so that the sheave 26 and tether 18 are always in the same plane. When on the ground, the aerostat is attached to the mooring system through mooring lines (not illustrated) and a nose cone on the aerostat mates with a nose latch assembly 28 at the top of tower 29, also carried by boom 22.

Figure 2:
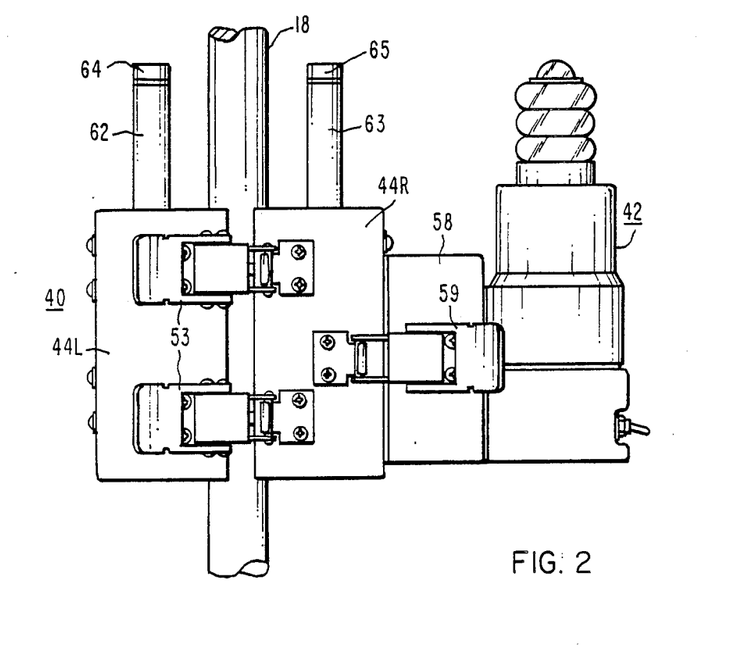
FIG. 2 is an elevational view of an attachment device in accordance with one embodiment of the present invention and FIG. 3 is a plan view thereof.
Figure 3:
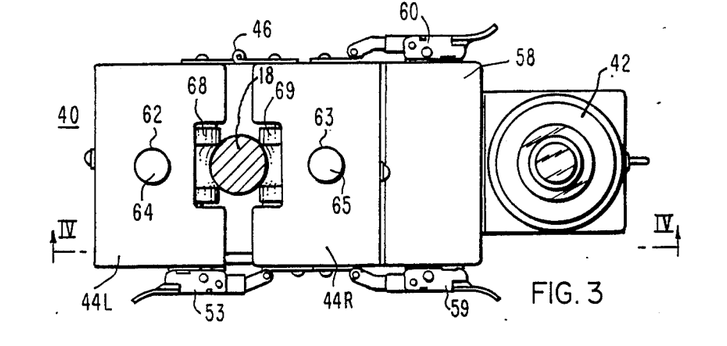

In order to warn aircraft which may be flying in the vicinity of the aerostat, visibility enhancement devices may be placed on the aerostat as well as on the tether 18. Several of these devices 36 are illustrated in FIG. 1 and by way of example may be strobe lights. As previously brought out, the strobe lights may be manually attached to the tether when it is being deployed, however, circumstances may dictate a maximum in-haul rate in which case manual removal of the devices becomes impractical or dangerous. Accordingly, a need exists for an attachment device which will securely grip the tether while on station and not slip down and yet allow rapid relative movement between the tether and the device to allow the devices to stack up at the flying sheave 26 during the rapid in-haul. One embodiment of a device in accordance with the present invention which allows this type of operation is illustrated in FIG. 2, and subsequent figures, to which reference is now made.

The attachment device is a unidirectional clamping means 40 for attachment to the tether 18 and for carrying a payload such as strobe light 42. The clamping means 40 defines a clamp assembly having left and right housing portions 44L and 44R, joined together by a hinge 46, and which housing portions structurally support a plurality of roller assemblies 48 to 51, seen in the cut-away view of FIG. 4. When placed on the tether during deployment, the two housing portions 44L and 44R are placed around the tether 18 and a firm grip thereon is established by closure of one or more overcenter latches 53.

Housing portion 44R may also serve as a point of attachment for the strobe light 42 along with its battery case 58, the attachment being made by means of latches 59 and 60.

As will be described, all of the clamp assemblies on the tether will stack up one on the other during an in-haul operation. Accordingly, some sort of shock absorbing means may be incorporated into the apparatus to prevent damage upon contact. For this purpose, therefore, the assembly includes first and second bumper shafts 62 and 63 mounted on respective housings 44L and 44R and including at the ends thereof respective energy absorbing bumpers 64 and 65.

The roller assemblies 48 to 51 (FIG. 4) serve to transfer the clamping force of the latches 53 to the tether 18 in such a manner as to reliably clamp the required visibility enhancement device such as strobe 42 to the tether 18 without damaging the tether in any way. The roller assemblies include respective rollers one or more of which is specifically designed so as to allow unlimited movement of the clamp assembly 40 relative to the tether 18 in a first direction and to allow only limited or no movement along the tether in an opposite direction.

Figure 4:
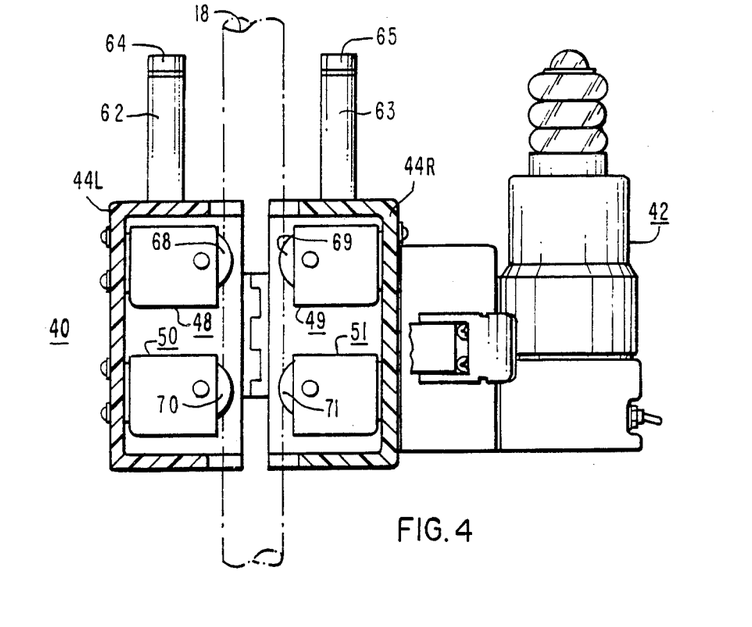
FIG. 4 is a view along line IV—IV of FIG. 3.

In FIG. 4 roller assemblies 48 to 51 include respective rollers 68 to 71 with roller pair 68, 69, being diametrically opposed around tether 18 as is roller pair 70, 71. The unidirectional clamping action may be provided by one roller pair, for example, 68, 69, while the remaining roller pair 70, 71 may, in addition to the clamping force be utilized as a restraining guide to prevent angular movement of the clamp assembly 40 relative to the cable 18.

Figure 5:
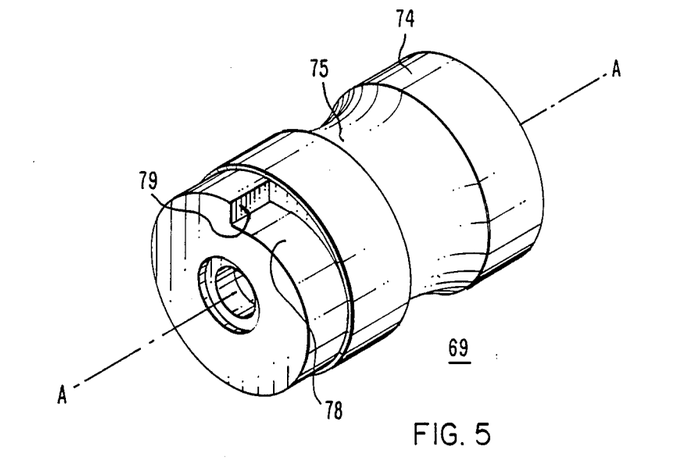
FIG. 5 is an isometric view of a roller which is utilized in the attachment device and FIG. 6 is an axial cross-sectional view thereof.

The roller assembly which includes a special roller is illustrated in more detail in FIGS. 5, 6, 7 and 8. In FIG. 5 roller 69 is adapted for rotation about an axis of rotation A—A. Roller 69, taken by way of example, includes a peripheral surface 74 having a concave groove 75 preferably of a curvature to substantially match the curvature of the tether.

Roller 69 includes at one end thereof a cam surface 78 defining a ratchet wheel having at least one tooth 79, and in a preferred embodiment only one tooth. If desired, the ratchet wheel configuration can be machined as part of, and be integral with the roller body.

Figure 6:
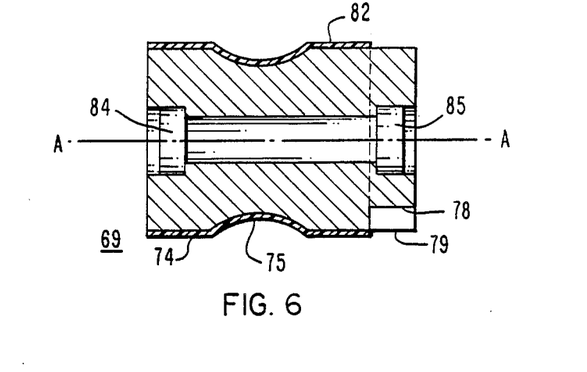

In order to cushion the tether and help distribute the gripping force over an even larger area of the tether jacket, the roller includes a relatively flexible covering 82, as illustrated in FIG. 6. The covering 82 is disposed on the peripheral surface of the roller in at least the groove portion 75, that is, the area of contact with the tether. By way of example, the flexible covering may be a shrink-fit tube of thermoplastic material. As illustrated in FIG. 6, the roller 69 includes a set of bearings 84 and 85 to ensure a smooth and easy rolling action and to provide for a balance of forces.

Figure 7:
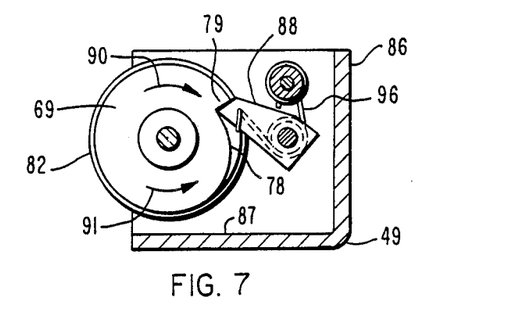
FIGS. 7 and 8 are respective elevational and plan views of a roller assembly together with a pawl arrangement.
Figure 8:
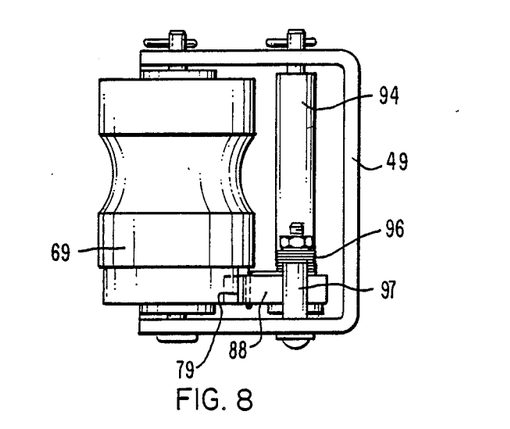

The means for limiting rotation of the roller in one direction around its axis of rotation while allowing unlimited rotation in an opposite direction around the axis is illustrated in FIGS. 7 and 8 with FIG. 7 being an elevational view of roller assembly 49 with its back wall 86 and floor 87 being in section, and FIG. 8 being a plan view thereof.

The means for limiting includes a pawl member 88 which rides on cam surface 78 and when pawl 88 engages tooth 79 further rotation of the roller in the direction of arrow 90 is prevented. Rotation in the direction of arrow 91, however, is unlimited since the pawl will ride on cam surface 78, thereafter on the surface of roller 69 and will thereafter drop from the edge of tooth 79 back down to the cam surface 78 and will continue to do so as long as roller 69 is contacting a tether being in-hauled.

Pawl member 88 is supported and maintained in position by means of a pawl spacer 94 secured to the side walls of the roller assembly 49. Pawl member 88 is urged into contact with the surface of the roller by means of a spring 96 held in position by means of a spring spacer 97.

Although only one ratcheted roller 69 has been described in detail, it is to be understood that roller assembly 48 (FIG. 4) could also have a pawl and single tooth ratchet arrangement as described in FIGS. 7 and 8, however, with the pawl and ratchet being on the opposite end of the roller to allow for unlimited rotation in a direction opposite to that of the opposed roller 69. When initially placing the clamp assembly around the tether, the pawl members of opposed ratcheted rollers may be placed into engagement with the single tooth of the ratchet such that rotation of the opposed rollers will thereafter be substantially synchronized, although such is not an absolute requirement.

As was stated, the ratchet preferably has only a single tooth. When clamped on the tether, small impulsive forces such as produced by the wind or tether vibrations, for example, may cause the clamp assembly to move up and down the tether by a limited distance. If the ratchet had many teeth, as is common in normal ratchet assemblies, a limited upward movement of the clamp assembly would allow the pawl to move past the tooth it is currently on to the next tooth thereby settling the clamp assembly at a new and higher position on the tether. With the single tooth arrangement, an exceptionally long impulsive force would be required to move the clamp assembly up far enough to make one complete revolution of the roller and lock again at a higher position.

As previously discussed, an operational situation may arise wherein the aerostat must be rapidly retrieved necessitating a maximum in-haul rate. As the in-haul operation proceeds, the clamp assemblies (and their attached strobe lights) are brought down with the tether and are stacked up at the flying sheave so that an operator does not have to physically handle the tether and clamping devices during in-haul. The clamp assembly construction is such that when the aerostat is fully deployed, the assembly will not ride down the tether (or will ride down a very limited distance until the pawl engages the ratchet tooth) but will fully allow relative movement of the tether past the rollers as the clamp assemblies are stacked up.

Figure 9:
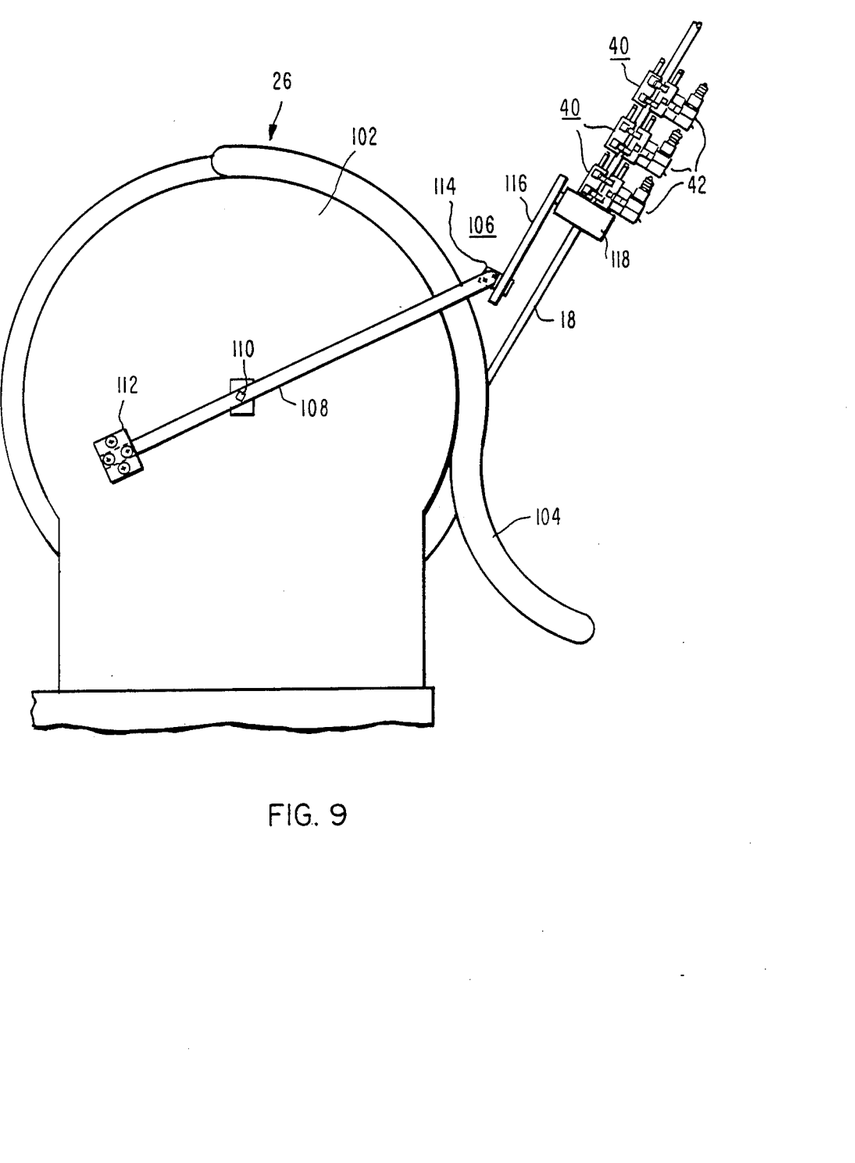
FIG. 9 illustrates one embodiment of a stop mechanism for the clamped-on attachment devices.

FIG. 9 illustrates one embodiment of a stop assembly which may be utilized at the flying sheave location. The flying sheave 26 has two side plates one of which, 102, is illustrated and to which is attached a tether guard 104. A stop assembly 106 includes a support arm 108 pivotable about point 110 and having at one end thereof counter-weight 112. Support arm 108, as well as a similar support arm (not illustrated) on the other side of the flying sheave connect with a cross-bar member 114 to which is connected arm 116 which supports the stop member 118. The construction is such that arm 116 remains parallel to tether 18 during movement of the stop assembly 106 caused by movement of the aerostat connected to the tether. FIG. 9 illustrates three clamp assemblies 40 together with attached strobe lights 42 stacked one on top of another and protected from damage with the provision of the bumper shafts and energy-absorbing bumpers.

Figure 10:
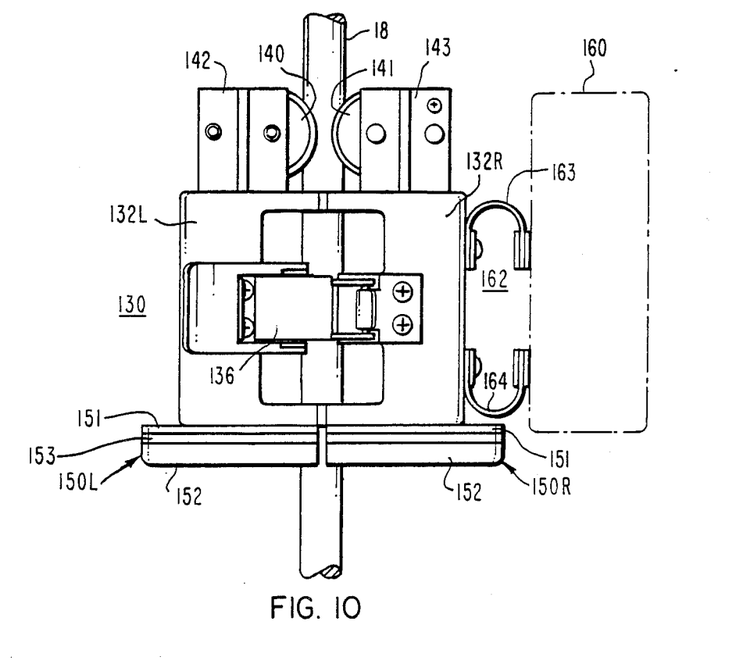
FIG. 10 is an elevational view of another embodiment of the present invention and FIG. 11 is a plan view thereof.
Figure 11:
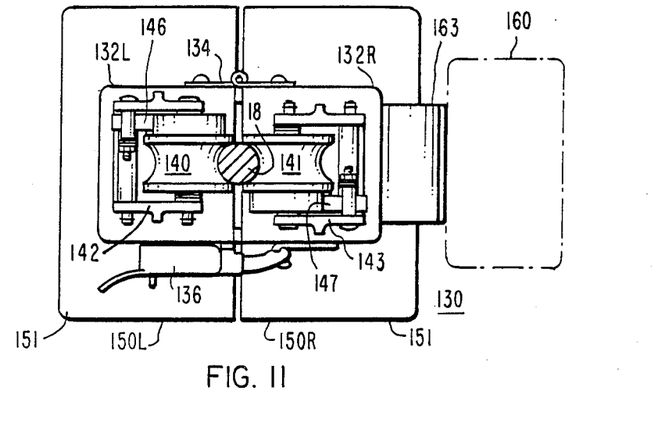

FIG. 10, which is an elevational view, and FIG. 11 which is a plan view, illustrate another embodiment of the invention wherein the clamp assembly 130 utilizes only two rollers. The assembly includes left and right support structures 132L and 132R joined by hinge 134 and closed around tether 18 by means of an overcenter latch 136 providing a positive closing force.

Rollers 140 and 141 are carried in respective brackets 142 and 143 mounted on respective support structures 132L and 132R. Each roller 140 and 141 is identical to the roller described in FIGS. 5 and 6 and each is associated with a respective spring biased pawl member 146 and 147 each of which rides on the cam surface of a roller and engages the single tooth of the ratchet so as to allow unlimited roller rotation in one direction but limited or no rotation in an opposite direction, as previously described.

Each half of the support structure 132L and 132R is connected at its lower end to respective spring plate assemblies 150L and 150R each of which includes an upper plate 151, a lower plate 152 and an intermediate energy absorbing layer 153. The spring plate assembly which has an aperture through which tether 18 passes, serves as a shock absorber when the clamp assemblies are stacked up during a rapid in-haul operation.

FIGS. 10 and 11 illustrate an alternate means for mounting a payload 160 such as a strobe light. The mounting means 162 includes U-shaped reinforced spring steel members 163 and 164 to which the payload 160 is attached and which additionally function as vibration isolators.

Figure 12:
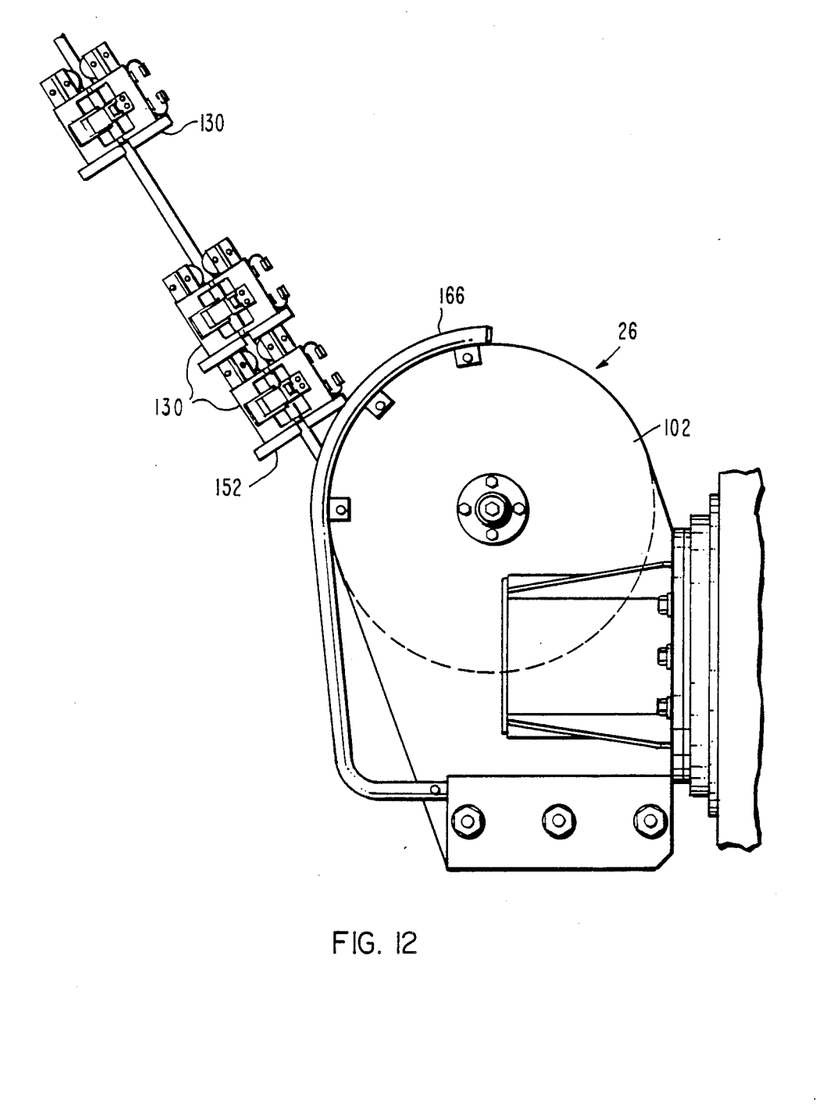
FIG. 12 illustrates an alternate, simplified stop mechanism for the devices.

FIG. 12 illustrates an alternate stop assembly which may be utilized. The stop assembly is a simplified version which is comprised of a tubular member 166 connected to each of the side plates of flying sheave 26. During an in-haul operation the clamp assembly such as 130 will stack up one upon the other and damage from repeated impacts is avoided by means of the shock absorbing function provided by the spring plate assembly. In this regard, for easy movement along the stop assembly 166, the lower plate 152 in contact with it is made of a material which is self-lubricating, acetal plastic being one example.

We claim:

1. Apparatus for attachment of a visibility enhancement device to a tether subject to deployment and in-haul operation, comprising:
   (A) at least one pair of rollers each having, and each being rotatable about, an axis of rotation;
   (B) a clamp assembly operable to structurally support said rollers and to clamp around said tether in a manner that said rollers firmly engage said tether; and
   (C) means for limiting rotation of at least one of said rollers in one direction around its axis of rotation while allowing unlimited rotation in an opposite direction around said axis.

2. Apparatus according to claim 1 wherein:
   (A) said rollers each include a peripheral surface having a concave groove;
   (B) said groove having a curvature to substantially match the curvature of said tether.

3. Apparatus according to claim 2 wherein:
   (A) each said roller includes a relatively flexible covering disposed on said peripheral surface in at least the area of contact with said tether.

4. Apparatus according to claim 3 wherein:
   (A) said covering is a shrink-fit thermoplastic tube.

5. Apparatus according to claim 1 wherein:
   (A) at least one said roller includes at one end thereof a ratchet wheel having at least one tooth;
   (B) said means for limiting includes a pawl member which contacts and rides on said ratchet wheel and prevents rotation of said roller about its axis in said one direction when said pawl member engages said tooth.

6. Apparatus according to claim 5 wherein:
   (A) said ratchet wheel has no more than one tooth.

7. Apparatus according to claim 5 wherein:
   (A) said ratchet wheel is an integral part of said roller and includes a cam surface.

8. Apparatus according to claim 7 which includes:
   (A) spring means engaging said pawl member and forcing it into contact with said cam surface.

9. Apparatus according to claim 1 wherein:
   (A) said pair of rollers are diametrically opposed when contacting said tether.

10. Apparatus according to claim 1 wherein:
    (A) means are provided for limiting rotation of both of said rollers of said pair.

11. Apparatus according to claim 1 which includes:
    (A) at least a second pair of rollers, each including a peripheral surface having a concave groove; and
    (B) said second pair of rollers being positioned such that the grooves thereof contact said tether.

12. Apparatus according to claim 1 wherein:
    (A) said rollers are positioned within said clamp assembly.

13. Apparatus according to claim 11 wherein:
    (A) said rollers are positioned within said clamp assembly.

14. Apparatus according to claim 1 wherein:
    (A) said rollers are mounted on brackets; and (B) said brackets are mounted on the outside of said clamp assembly.

15. Apparatus according to claim 1 wherein:
(A) said clamp assembly includes first and second sections; and which includes
(B) hinge means joining said sections; and
(C) at least one latch for securing said sections together around said tether.

16. Apparatus according to claim 1 which includes:
(A) means for mounting said visibility enhancement device on said clamp assembly.

17. Apparatus according to claim 16 wherein:
(A) said means for mounting is a vibration isolator.

18. Apparatus according to claim 1 which includes:
(A) a stop assembly positioned around said tether and operable to stop movement of a first of said clamp assemblies during said in-haul operation and to cause stacking up of subsequent ones of said clamp assemblies which may be attached to said tether.

19. Apparatus according to claim 18 wherein:
(A) each said clamp assembly includes shock absorbing means to reduce the effects of impact of said clamp assemblies during said stacking up.

20. Apparatus according to claim 1 which includes:
(A) an aerostat;
(B) a deployment/in-haul system for launching and retrieving said aerostat; and
(C) said tether being connected between said deployment/in-haul system and said aerostat.

21. Apparatus according to claim 18 which includes:
(A) an aerostat;
(B) a deployment/in-haul system for launching and retrieving said aerostat;
(C) said tether being connected between said deployment/in-haul system and said aerostat;
(D) said deployment/in-haul system including a horizontal boom member having a sheave assembly at one end thereof and around which said tether passes; and
(E) said stop assembly being connected to said sheave assembly.

* * * * *